Dec. 21, 1926.

N. E. BELL

APPARATUS FOR APPLYING FERTILIZER

Filed June 27, 1925

1,611,406

Inventor:
Needham Eric Bell
by
Attorney

Patented Dec. 21, 1926.

1,611,406

UNITED STATES PATENT OFFICE.

NEEDHAM ERIC BELL, OF CLOVERDALE, ALABAMA.

APPARATUS FOR APPLYING FERTILIZER.

Application filed June 27, 1925. Serial No. 39,967.

The invention relates to the application of fertilizers along with and through the agency of a spray or scattering stream of water, the objects of the invention being to provide new, useful and efficient means for applying suitable fertilizers to vegetation as and when the same is irrigated or sprinkled and to utilize the force of the stream of water to effect spreading or distribution of the fertilizer. The invention is particularly designed for use in connection with gardening, lawn culture and truck farming, for all of which it is highly useful.

Figure 1:
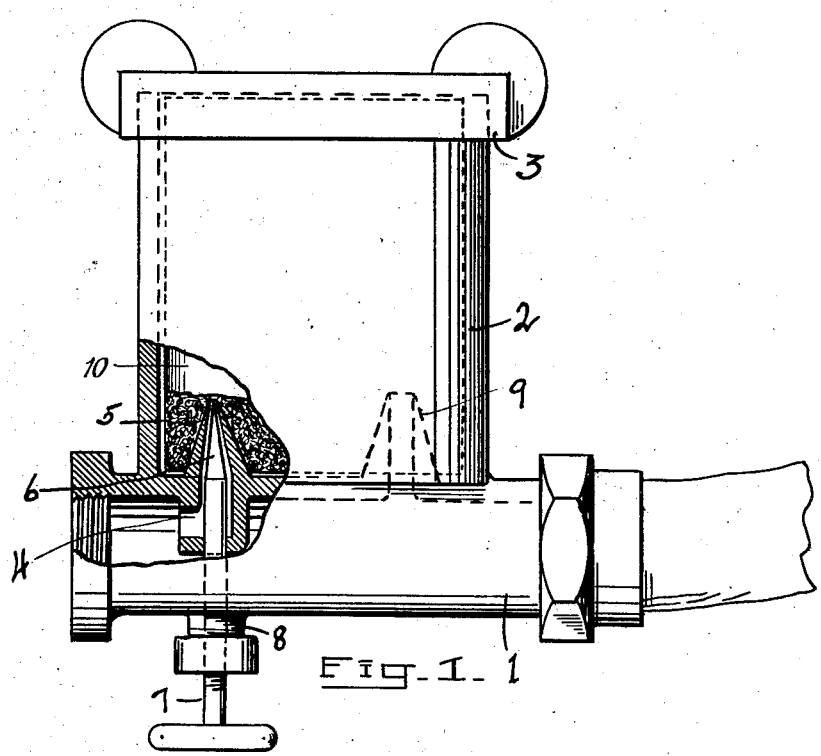
Figure 2:
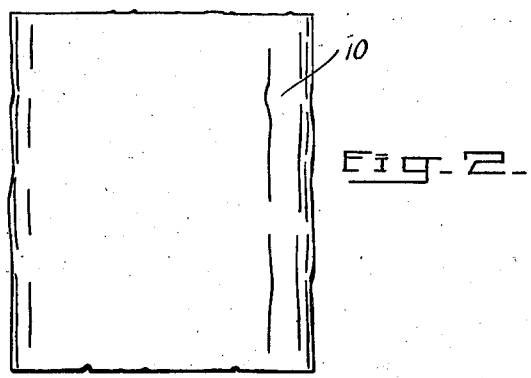

In the drawing Fig. 1 shows a typical apparatus, partly in section, while Fig. 2 is a package or cartridge of fertilizer adapted for use with such apparatus.

The apparatus, in its preferred form, is a chamber adapted to hold a supply of fertilizer, such chamber connected to a stream of water, as in a pipe or conduit, in such way that by differential pressure the fertilizer in the chamber will be introduced into and carried along by such stream.

In Fig. 1 I show such an apparatus, the fertilizer chamber and conduit being integral, though this is merely a convenience of manufacture. At 1 I provide a pipe or conduit above which is a chamber 2, for the fertilizer, covered by a screw cap 3. As will be seen at the left, part of the walls of 1 and 2 being broken away, a Pitot tube 4 is positioned in the conduit, opening into the chamber 2 through a cone-shaped nozzle 5, governed by a conical or needle valve at 6, the stem 7, of which, is carried through the wall of conduit 1 by an appropriate stuffing box 8. This permits of variation in flow through the Pitot tube from conduit to chamber. A second conical nozzle, 9, shown in dotted lines, opens directly from the wall of the conduit 1 to chamber 2 and is of larger diameter than the maximum opening of the first nozzle. It is obvious that through the use of these two nozzles, the one being the outlet of a Pitot tube and the other opening flush with the wall of the conduit that a differential pressure will exist and water will flow up into chamber 2 by the first and back again through the second nozzle.

The function of the nozzles is this: For convenience I provide cartridges or packages of fertilizer, such as the substantially cylindrical example shown at 10 in Fig. 2, which is simply a paper bag containing the fertilizing material, more or less water-soluble. On unscrewing cap 3 this cartridge or bag may be slipped inside chamber 2 and perforated by the two nozzles. The cap 3 may then be screwed home and the apparatus is ready to function as soon as water flows in the conduit 1.

As made up the apparatus is highly suitable for such small scale fertilizing as that of lawns, flower beds, gardens, and the like, though it may by mere increase of dimensions be made entirely suitable for more extensive operations.

In ordinary use the apparatus would be connected between the usual hose and hydrant and may be left as a permanent connection to the hydrant where it will not interfere with ordinary sprinkling for unless first charged with a supply of fertilizer the apparatus will not function. Obviously in any pressure irrigation system through piping from an elevated tank or other supply the apparatus, on sufficiently large scale, would be introduced at a suitable point on the line back of all branches through which the spread of fertilizer is to be effected.

It is not contemplated that the apparatus be confined to use with water-soluble fertilizers, though, of course, these are preferable, for, if the fertilizing material be in the usual more or less finely ground or powdered condition it will be very effectually carried along with the stream of water and reach the vegetation along with the spray.

It is to be understood that the particular combination of fertilizer chamber and Pitot tube and plain inlet to the water chamber is not by any means the only type which the apparatus may take. It is to be regarded as typical of a closed chamber so connected to a water conduit by suitable openings that differential pressures will result during the passage of a stream of water, effective to introduce fertilizer into the stream. The arrangement with the Pitot tube is merely that which presents distinct advantages for the smaller installations. It will be immediately evident that if the two nozzles had flush openings into pipe or conduit 1 a contraction of diameter of the conduit between the two openings might be arranged to produce sufficient differential pressure to withdraw the fertilizer.

The function of the needle valve scarcely needs explanation. By regulation of the flow through the entry nozzle the rate of feeding of fertilizer can be readily governed from a maximum to nothing. The location of this valve, of course, is merely a matter of convenience and the valve could be omitted if only one standard rate of feeding was desired.

Having described the invention, what I claim is:—

1. In apparatus of the class described, the combination with a perforable package arranged to contain fertilizer, of a chamber arranged to hold such package, a conduit arranged to hold a supply of water under pressure, channels connecting said conduit to said chamber and terminating in nozzles therein arranged to perforate said package, and said channels so arranged that differential pressures will exist therein when a stream of water flows through said conduit.

2. The combination with a chamber, a conduit arranged to be connected to a source of water under pressure, conduits from said first conduit terminating in said chamber in relatively sharp nozzles and so arranged that differential pressure will exist in said conduits entering the chamber, and a package arranged to contain fertilizer and having walls adapted to be perforated by said nozzles, substantially as set forth.

In witness whereof I have hereunto set my hand at Montgomery, Alabama, this June 24, 1925.

NEEDHAM ERIC BELL.